(12) United States Patent
Dettinger et al.

(10) Patent No.: US 8,090,737 B2
(45) Date of Patent: Jan. 3, 2012

(54) USER DICTIONARY TERM CRITERIA CONDITIONS

(75) Inventors: Richard D. Dettinger, Rochester, MN (US); Frederick A. Kulack, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/411,524

(22) Filed: Mar. 26, 2009

(65) Prior Publication Data

US 2010/0250574 A1   Sep. 30, 2010

(51) Int. Cl.
*G06F 17/30* (2006.01)
(52) U.S. Cl. .................. 707/763; 707/E17.014
(58) Field of Classification Search .................. 707/760, 707/763
See application file for complete search history.

(56) References Cited

U.S. PATENT DOCUMENTS

| | | | |
|---|---|---|---|
| 7,251,653 B2 * | 7/2007 | Huang et al. .................. 707/756 |
| 2004/0186828 A1 * | 9/2004 | Yadav et al. ...................... 707/3 |
| 2004/0193579 A1 * | 9/2004 | Dettinger et al. ................. 707/3 |
| 2005/0044064 A1 * | 2/2005 | Haase ................ 707/3 |
| 2006/0136382 A1 * | 6/2006 | Dettinger et al. ................. 707/3 |
| 2006/0161522 A1 * | 7/2006 | Dettinger et al. ................. 707/3 |
| 2006/0161557 A1 * | 7/2006 | Dettinger et al. ............. 707/100 |

* cited by examiner

*Primary Examiner* — John E Breene
*Assistant Examiner* — Albert Phillips, III
(74) *Attorney, Agent, or Firm* — Patterson & Sheridan LLP

(57) ABSTRACT

Techniques are disclosed for processing an abstract query which includes a dictionary term criteria condition. The dictionary term criteria condition is used to specify a set of one or more keywords, each of which should appear in a distinct document (of a defined set of documents) in order for the condition to be satisfied. In one embodiment, a user defines an abstract query by specifying a model entity (a logical focus for a query used to identify a set of documents associated with the model entity), logical fields (specifying query conditions and information to be returned), and a set of terms for a dictionary term criteria condition.

21 Claims, 12 Drawing Sheets

642

```
         SELECT MET.PATIENT_ID
         FROM DQBSAMPL.PATIENTINFO MET
         WHERE othercondition1
         AND othercondition2
         OR (othercondition3
              AND MET.PATIENT_ID
              IN
705 ─────    (SELECT T5.PATIENT_ID
              FROM /* ddqb://Application/Entities/Patient Info */ DQBSAMPL.PATIENTINFO t6

INNER JOIN
              (SELECT DISTINCT
710 ─────         T1.PATIENT_ID,
                  T2.HITCOL1,
                  T3.HITCOL2,
                  T4.HITCOL3
              FROM /* ddqb://Application/Entities/Patient Info */ DQBSAMPL.PATIENTINFO t1

LEFT JOIN
              (SELECT TEXTTABLE.PATIENT_ID,
715 ─────         CONTAINS (ORIG_DOC,"'taxes'") AS HitCol1
              FROM DQBSAMPL.CLINICAL_NOTE TEXTTABLE
              ) t2 ON t1.PATIENT_ID = t2.PATIENT_ID LEFT JOIN
              (SELECT TEXTTABLE.PATIENT_ID,
715 ─────         CONTAINS (ORIG_DOC,"'hiccupping'") AS HitCol2
              FROM DQBSAMPL.CLINICAL_NOTE TEXTTABLE
              ) t3 ON t1.PATIENT_ID = t3.PATIENT_ID LEFT JOIN
              (SELECT TEXTTABLE.PATIENT_ID,
715 ─────         CONTAINS (ORIG_DOC,"'satisfied'") AS HitCol3
              FROM DQBSAMPL.CLINICAL_NOTE TEXTTABLE
              ) t4 ON t1.PATIENT_ID = t4.PATIENT_ID WHERE t1.AUTHORIZATION_ID1 IS NULL
              ) t5 ON t6.PATIENT_ID = t5.PATIENT_ID WHERE t6.AUTHORIZATION_ID1 IS NULL 720 ─────    GROUP BY T5.PATIENT_ID
725 ─────    HAVING MAX (T5.HITCOL1)>0
                  AND MAX (T5.HITCOL2)>0
                  AND MAX (T5.HITCOL3)>0
705 ─────    ) dict
         )
```

```
SELECT MET.PATIENT_ID
FROM DQBSAMPL.PATIENTINFO
WHERE MET.PATIENT_ID
IN
      (SELECT T5.PATIENT_ID
       FROM /* ddqb://Application/Entities/Patient Info */ DQBSAMPL.PATIENTINFO t6

INNER JOIN
         (SELECT DISTINCT T1.PATIENT_ID
          FROM /* ddqb://Application/Entities/Patient Info */ DQBSAMPL.PATIENTINFO t1

WHERE EXISTS
            (SELECT TEXTTABLE.PATIENT_ID
             FROM DQBSAMPL.CLINICAL_NOTE T2
             WHERE t1.PATIENT_ID = t2.PATIENT_ID
             AND  CONTAINS (ORIG_DOC,'"taxes"')>0
            )

AND EXISTS
            (SELECT TEXTTABLE.PATIENT_ID
             FROM DQBSAMPL.CLINICAL_NOTE t3
             WHERE t1.PATIENT_ID = t3.PATIENT_ID
             AND  CONTAINS (ORIG_DOC, '"hiccupping"' )>0
            )

AND EXISTS
            (SELECT TEXTTABLE.PATIENT_ID
             FROM DQBSAMPL.CLINICAL_NOTE T4
             WHERE t1.PATIENT_ID = t4.PATIENT_ID
             AND  CONTAINS (ORIG_DOC, '"satisfied"' )
            )

WHERE t1.AUTHORIZATION_ID1 IS NULL
         ) t5 ON t6.PATIENT_ID = t5.PATIENT_ID

WHERE t6.AUTHORIZATION_ID1 IS  NULL
      ) dict
```

FIG. 7B

USER DICTIONARY TERM CRITERIA CONDITIONS

BACKGROUND OF THE INVENTION

1. Field of the Invention

Embodiments of the present invention generally relate to data processing, and more particularly, to techniques for composing queries with dictionary term criteria conditions.

2. Description of the Related Art

Databases are well known systems for storing, searching, and retrieving information stored in computer systems. A particularly common type of database is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc.), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. Pat. No. 6,996,558 (the '558 patent) entitled "Application Portability and Extensibility through Database Schema and Query Abstraction," discloses techniques for constructing a database abstraction model over an underlying physical database.

The '558 patent discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

However, even though the database abstraction model can simplify the use of an underlying database, it can nonetheless be very complex, particularly when it includes a large number of logical fields. One approach to simplifying a database abstraction model is the use of model entities, which provide an entity focus for abstract queries. For example, commonly assigned U.S. Pat. No. 7,054,877 (the '877 patent) entitled "Dealing with Composite Data through Data Model Entities" discloses the use of model entities to provide a focus for abstract queries. The '877 patent discloses query interfaces configured to enable a user to compose abstract queries from logical fields of the database abstraction model, and to specify a model entity to provide a focus for the composed abstract query.

SUMMARY OF THE INVENTION

One embodiment of the invention provides a computer-implemented method for processing an abstract query of an underlying physical database. The method may generally include providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity. The method may also include receiving an abstract query composed from one or more logical fields of the database abstraction model. At least a first logical field in the abstract query is specified in a dictionary term criteria condition, and the dictionary term criteria condition includes a list of one or more keywords. Further, the access method specified by the first logical field maps the first logical field to a plurality of documents related to a given instance of the model entity, and the dictionary term criteria condition is evaluated by determining whether the plurality of documents related to the given instance of the model entity includes at least a distinct document containing a respective one of the one or more keywords.

The method may also include generating, from the abstract query, a resolved query of the underlying physical database and storing the resolved query for execution against the underlying physical database.

Still another embodiment of the invention includes a computer-readable storage medium containing a program which, when executed on a processor, performs an operation for processing an abstract query of an underlying physical database. The operation may generally include providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity. The operation may also include receiving an abstract query composed from one or more logical fields of the database abstraction model. At least a first logical field in the abstract query is specified in a dictionary term criteria condition, and the dictionary term criteria condition includes a list of one or more keywords. Further, the access method specified by the first logical field maps the first logical field to a plurality of documents related to a given instance of the model entity, and the dictionary term criteria condition is evaluated by determining whether the plurality of documents related to the given instance of the model entity includes at least a distinct document containing a respective one of the one or more keywords.

The operation may also include generating, from the abstract query, a resolved query of the underlying physical database and storing the resolved query for execution against the underlying physical database.

Still another embodiment of the invention includes a system having a processor a memory storing an application, which, when executed by the processor is configured to perform an operation for processing an abstract query of an underlying physical database. The operation may generally include providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity. The operation may also include receiving an abstract query composed from one or more logical fields of the database abstraction model. At least a first logical field in the abstract query is specified in a dictionary term criteria condition, and the dictionary term criteria condition includes a list of one or more keywords. Further, the access method specified by the first logical field maps the first logical field to a plurality of documents related to a given instance of the model entity, and the dictionary term criteria condition is evaluated by determining whether the plurality of documents related to the given instance of the model entity includes at least a distinct document containing a respective one of the one or more keywords.

The operation may also include generating, from the abstract query, a resolved query of the underlying physical database and storing the resolved query for execution against the underlying physical database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 7A-7B illustrate an example database query generated in response to an abstract query which includes a dictionary term criteria condition, according to one embodiment of the invention;

DETAILED DESCRIPTION OF THE PREFERRED EMBODIMENTS

Figure 1:
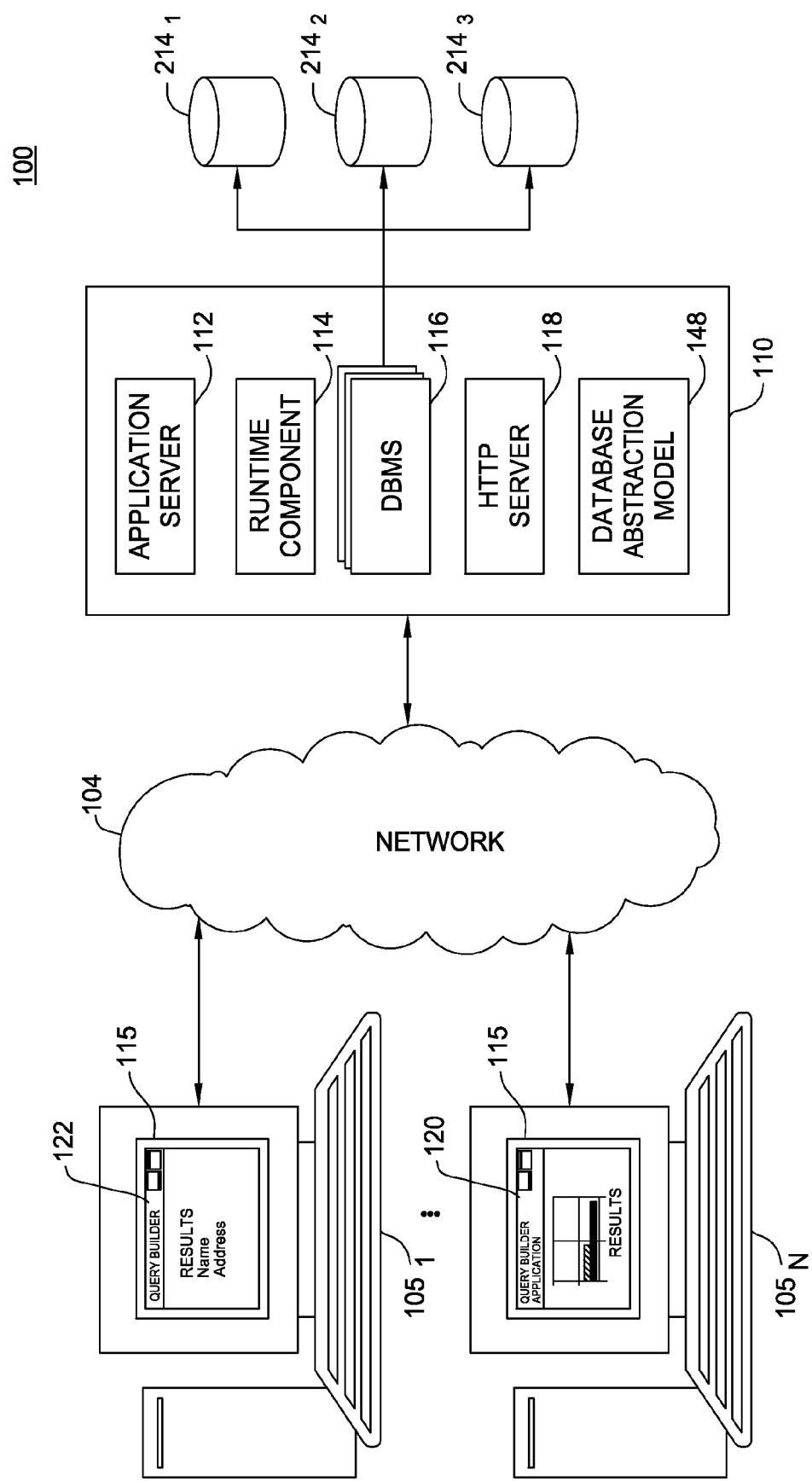
FIG. 1 illustrates a network environment using a client-server configuration, according to one embodiment of the invention.

Embodiments of the invention allow users to compose queries which include a user dictionary term criteria condition. The dictionary term criteria condition is used to specify a set of one or more keywords, each of which should appear in a distinct document in order for the condition to be satisfied. In one embodiment, a user defines an abstract query by specifying a model entity (a logical focus for a query), logical fields (specifying query conditions and information to be returned), and a set of terms for a dictionary term criteria condition. The model entity defines a focus of the query, e.g., a query to return information about "patients" in a database of medical records. In such a case, the dictionary term criteria condition could be evaluated using a collection of patient visit notes. For a given patient, if at least one distinct note includes each of the terms specified for the dictionary term criteria condition, then information requested about that patient (as specified by the query) is included in the query results.

For example, a user may want to identify patients that have been diagnosed with 'disease 1, disease 2 . . . disease N,' where the information about diagnosed diseases is contained in multiple sources identified as patient visit notes. Such a request is an example of a dictionary term criteria condition. Patients often make multiple doctor visits and different diseases may be diagnosed during different times, by different doctors, and thus, are located in different documents. To receive an answer to the request, the user builds an abstract query which identifies a model entity—'patient'—and includes the terms—'diagnosis 1, diagnosis 2 . . . diagnosis N.' According to the techniques described herein, this abstract query is transformed and executed, generating a list of patients that have been diagnosed at some point of time with each of the diseases 1-N based on one or more documents, where each of the one or more documents contains information about a patient being diagnosed with more than one disease on the list.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computing system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system 105 using web-browser 122. In such an embodiment, the server system 110 includes a Hypertext Transfer Protocol (HTTP) server 118 (e.g., a web server such as the open source Apache web-server program or IBM's WebSphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system 105. The web-browser 122 and application 120 may be configured to allow a user to compose an abstract query, and to submit the query to the runtime component 114 for processing.

As illustrated in FIG. 1, server system 110 may further include runtime component 114, database management system (DBMS) 116, and database abstraction model 148. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) statements from an abstract query. The resolved queries generated by the runtime component 114 are supplied to DBMS 116 for execution. Additionally, the runtime component 114 may be configured to modify the resolved query with additional restrictions or conditions, based on the focus of the abstract query, i.e., based on the model entity specified for a given query.

Figure 2A:
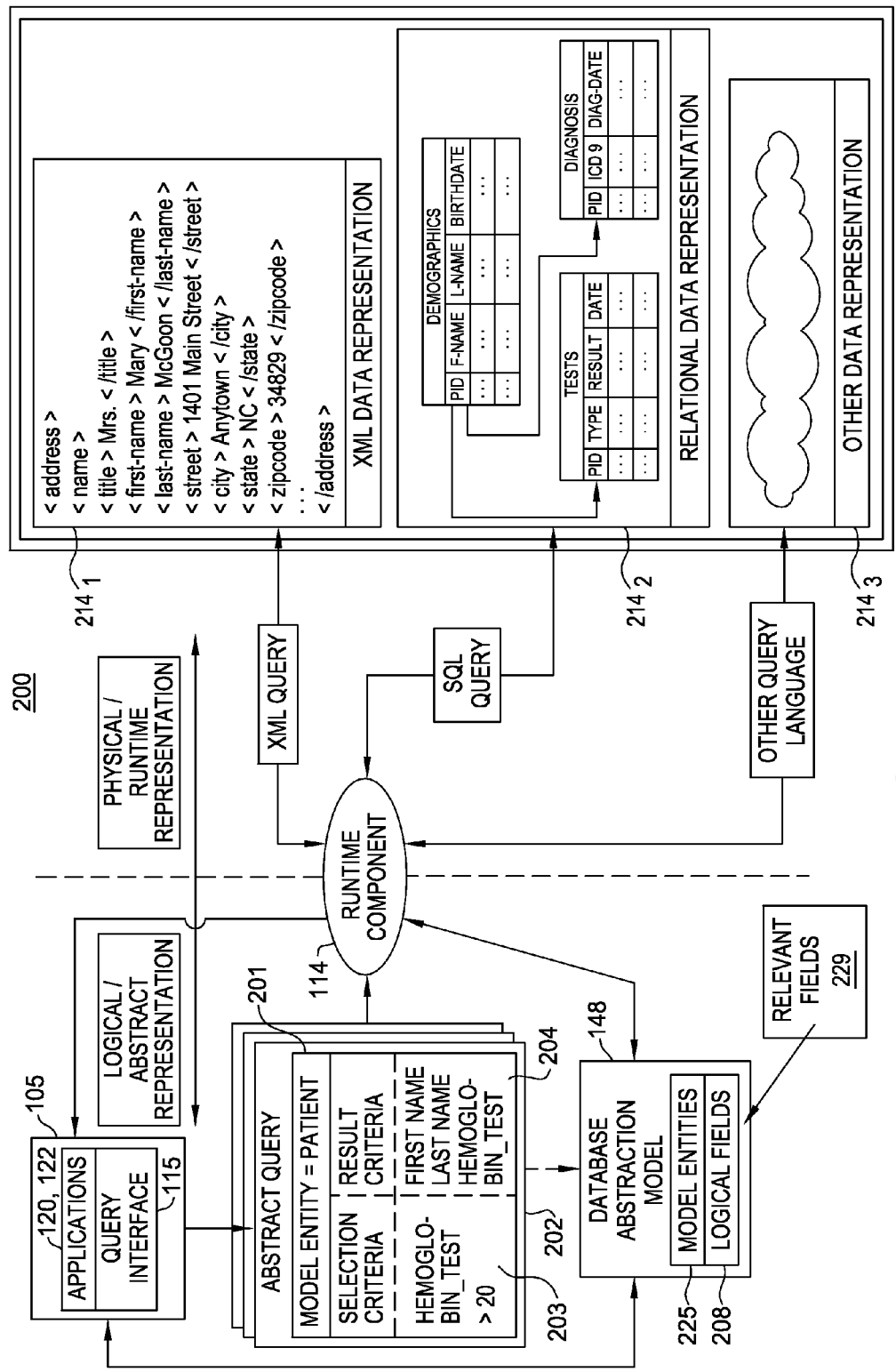
FIGS. 2A-2D illustrate a logical view of a database abstraction model constructed over an underlying physical database, according to one embodiment of the invention.

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208, model entities 225, and relevant fields 229. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility," etc). For example, abstract query 202 includes an indication that the query is directed to instances of the "patient" model entity 201, and further includes selection criteria 203 indicating that patients with a "hemoglobin_test>20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

As stated, in one embodiment, an abstract query may specify a type of model entity being queried (e.g., a patient, an employee or a test). That is, a model entity defines the focus, or central concept, for an abstract query. Rather than compose a query data based on the structure of an underlying database (e.g., an SQL schema), users compose a query about a model entity (e.g., about a patient) by specifying which logical fields should be used to evaluate whether a given instance of the model entity should be included in the query results. Doing so allows users to compose complex queries in a straightforward and intuitive manner. However, as stated, not all logical fields 208 are typically going to be related to each of the model entities 225. Thus, an interface that presents a complete collection of logical fields 208 to a user may become cluttered and confusing, at best, or worse, may allow users to compose an abstract that cannot be resolved into a corresponding physical query. The use of model entities to provide a focus for abstract queries is described in commonly assigned U.S. Pat. No. 7,054,877 (the '877 patent) entitled "Dealing with Composite Data through Data Model Entities."

In one embodiment, relevant fields 229 include each logical field 208 of database abstraction model 148 that is relevant to a given model entity 225. As used herein, "relevant fields" are logical fields 208 that store data related to a given model entity 225 and are available to include in an abstract query 202 directed to that model entity 225. The particular logical fields 208 which are available may include the complete set of "relevant fields" but may also include a subset of those logical fields. As stated, for example, logical fields associated with a model entity may be marked as unavailable in a given case due to database resources that are unavailable to the user composing an abstract query based on a user profile. That is, the user may be authorized to compose a query regarding a given model entity, but may not be authorized to access everything about that entity available through the relevant logical fields. Similarly, if database resources are unavailable or under development, logical fields that reference such resources may be marked as unavailable. As another example, logical fields may be made unavailable when their use in an abstract given query would exceed the system resources from a complexity or performance perspective (or resources allocated to a given user).

Thus, in one embodiment, a user of query interface 115 composing an abstract query 202 for a specific model entity 225 may be presented with only the relevant fields 229 that correspond to that model entity 225.

In one embodiment, relevant fields 229 may be generated at a start-up time for a computer system (e.g., server system 110). Alternatively, relevant fields 229 may be generated periodically (e.g., daily, weekly, monthly, etc.) or whenever a change is made to a related part of database abstraction model 148, for example adding/modifying a logical field, adding/modifying a model entity, adding/modifying a relationship, etc.

In another embodiment, relevant fields 229 may be generated when a given user logs in or when the user composes an abstract query directed to a particular model entity. In such a case, the relevant logical fields may be evaluated dynamically based on a user profile, and only the logical field associated with the model entity (and not marked unavailable) are presented in to the user (e.g., as part of query interface 115). Relevant fields 229 may be stored by any suitable technique, for example in a database table, in an XML data file, and the like.

In one embodiment, runtime component 114 retrieves data from physical database 214 by generating a resolved query (e.g., an SQL statement) from abstract query 202. Because database abstraction model 148 is not tied to either the schema of physical database 214 or the syntax of a particular query language, additional capabilities may be provided by database abstraction model 148 without having to modify the underlying database. Further, depending on the access method specified for a logical field, runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

Figure 2B:
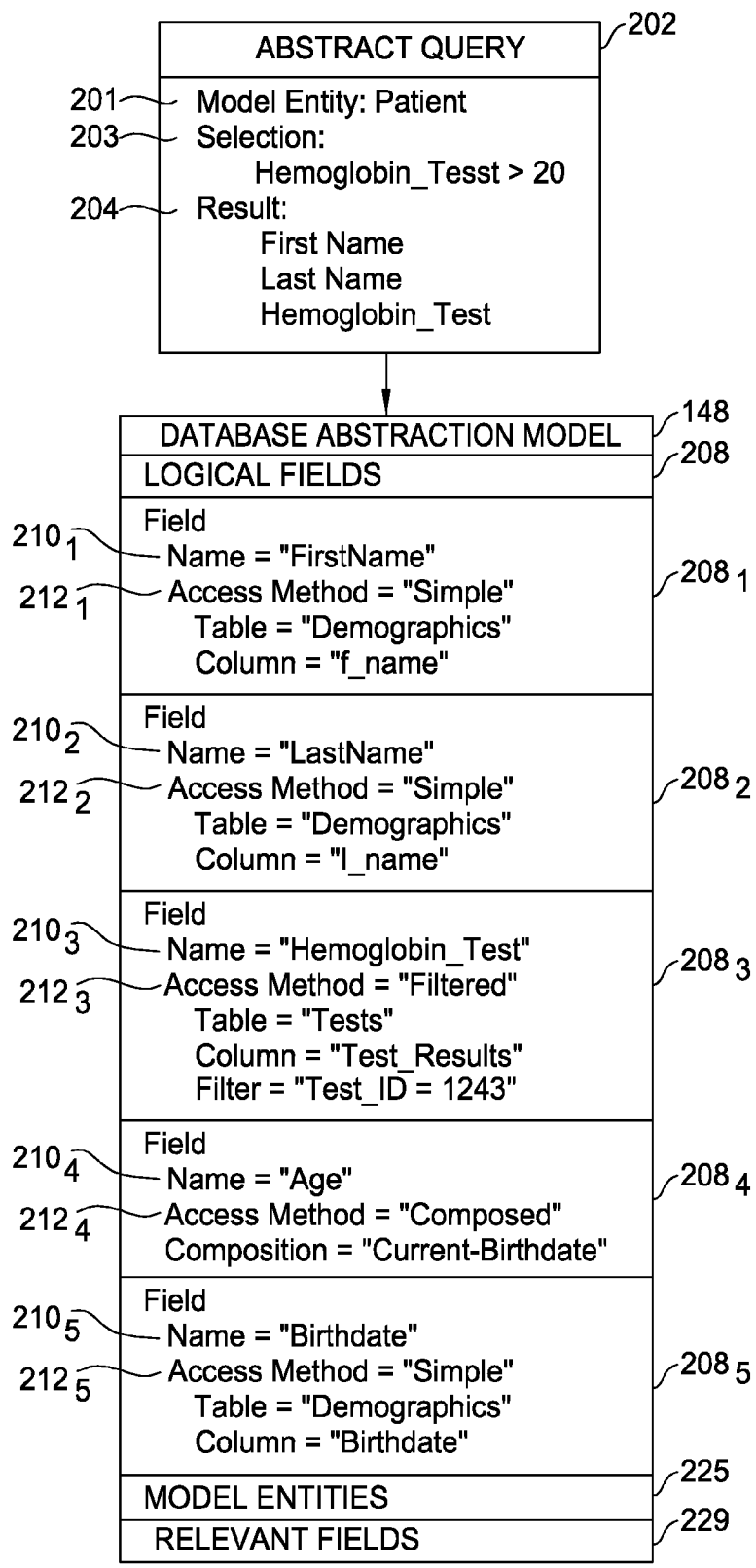
Figure 2C:
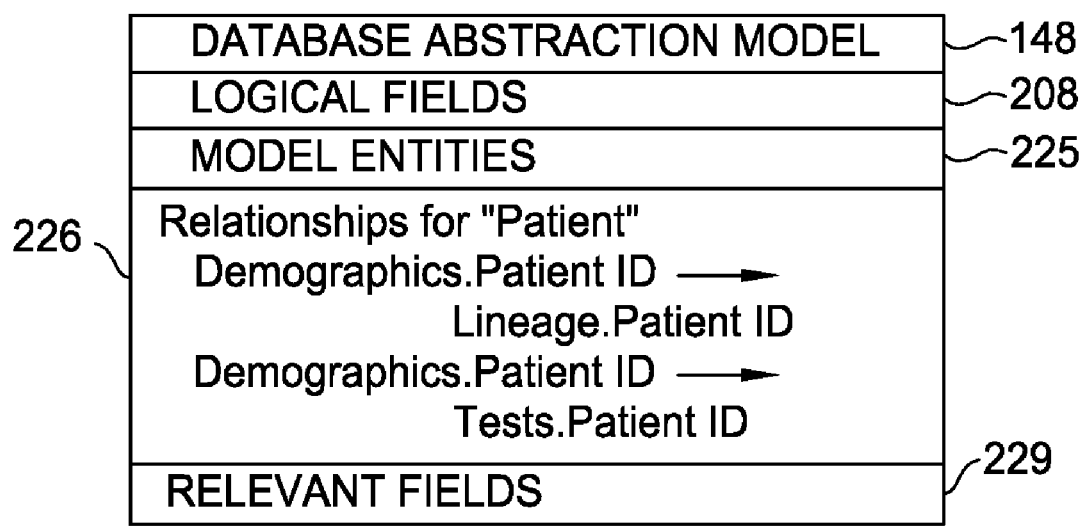
Figure 2D:
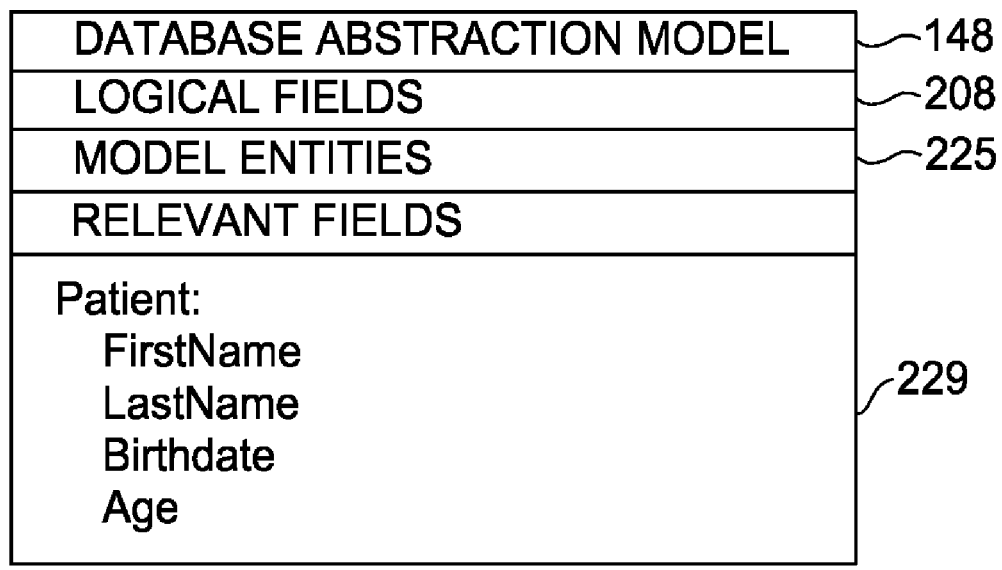

FIGS. 2B-2D illustrate an exemplary abstract query 202, relative to the database abstraction model 148, according to one embodiment of the invention. As shown in FIG. 2B, abstract query 202 includes selection criteria 203 indicating that the query should retrieve instances of the patient model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between a particular model entity and the query results.

An illustrative abstract query corresponding to abstract query 202 is shown in Table I below. In this example, the abstract query 202 is represented using eXtensible Markup Language (XML). In one embodiment, query interface 115 may be configured to enable a user to compose an abstract query, and to generate an XML document to represent the finished abstract query. Those skilled in the art will recognize that XML is a well known markup language used to facilitate the sharing of structured text and information, other markup languages, however, may be used.

TABLE I

Query Example

```
001 <?xml version="1.0"?>
002 <!--Query string representation: ("Hemoglobin_test > 20")
003 <QueryAbstraction>
004   <Selection>
005     <Condition>
006       <Condition field="Hemoglobin Test" operator="GT"
          value="20"
007     </Condition>
008   </Selection>
009   <Results>
010        <Field name="FirstName"/>
011        <Field name="LastName"/>
012        <Field name="hemoglobin_test"/>
013   </Results>
014   <Entity name="Patient" >
015        <FieldRef name="data://patient/PID" />
016        <Usage type="query" />
017       </EntityField>
018   </Entity>
019 </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Lines 14-18 identify the model entity selected by a user, in this example, a "Patient" model entity. Thus, the query results returned for abstract query 202 are instances of the "Patient" model entity. Line 15 indicates the identifier in the physical database 214 used to identify instances of the model entity. In this case, instances of the "Patient" model entity are identified using values from the "Patient ID" column of a patient table.

After composing an abstract query, a user may submit it to runtime component 114 for processing. In one embodiment, runtime component 114 may be configured to process abstract query 202 by generating an intermediate representation of abstract query 202, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in abstract query 202, and further identify how to join columns of data together. Runtime component 114 may then parse the intermediate representation in order to generate a physical query of the underlying physical database (e.g., an SQL statement(s)). Abstract query plans and query processing are further described in a commonly assigned U.S. Pat. No. 7,461,052 (the '052 patent) entitled "Abstract Query Plan."

FIG. 2B further illustrates an embodiment of a database abstraction model 148 that includes a plurality of logical field specifications $208_{1-5}$ (five shown by way of example). The access methods included in logical field specifications 208 (or logical field, for short) are used to map the logical fields 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "Hemoglobin Test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of database abstraction model 148, or other logical field specifications, may map to other physical data representations (e.g., databases $214_1$ or $214_3$ illustrated in FIG. 2A). Further, in one embodiment, database abstraction model 148 is stored on computer system 110 using an XML document that describes the model entities, logical fields, access methods, and additional metadata that, collectively, define the database abstraction model for a particular physical database system. Other storage mechanisms or markup languages, however, are also contemplated.

Referring to FIG. 2C, database abstraction model 148 also includes model entities 225. Illustratively, only a single model entity 225 is shown, for the model entity "Patient." As shown, model entity 225 includes a set of relationships 226 which identify data available in database 214 that is related to instances of the "Patient" model entity. For example, the first model entity relationship 226 indicates that data from a "Demographics" table and a "Lineage" table are linked by columns named "Patient ID." Further, the second model entity relationship 226 indicates that data from the "Demographics" table and a "Tests" table are linked by columns named "Patient ID." Collectively, relationships 226 define the "universe" of data about the model entity 225 stored in the underlying physical database 214. That is, relationships 226 specify what physical tables and fields are accessible for a given model entity 225.

Referring to FIG. 2D, database abstraction model 148 also includes relevant fields 229. As shown, relevant fields 229 correspond to the "Patient" model entity 225, and include the logical fields "FirstName," "LastName," "Birthdate" and "Age." As described above, relevant fields 229 may identify the logical fields 208 of database abstraction model 148 that are relevant to a given model entity 225. In one embodiment, relevant fields 229 may be generated from relationships 226 and logical fields 208.

Figure 3:
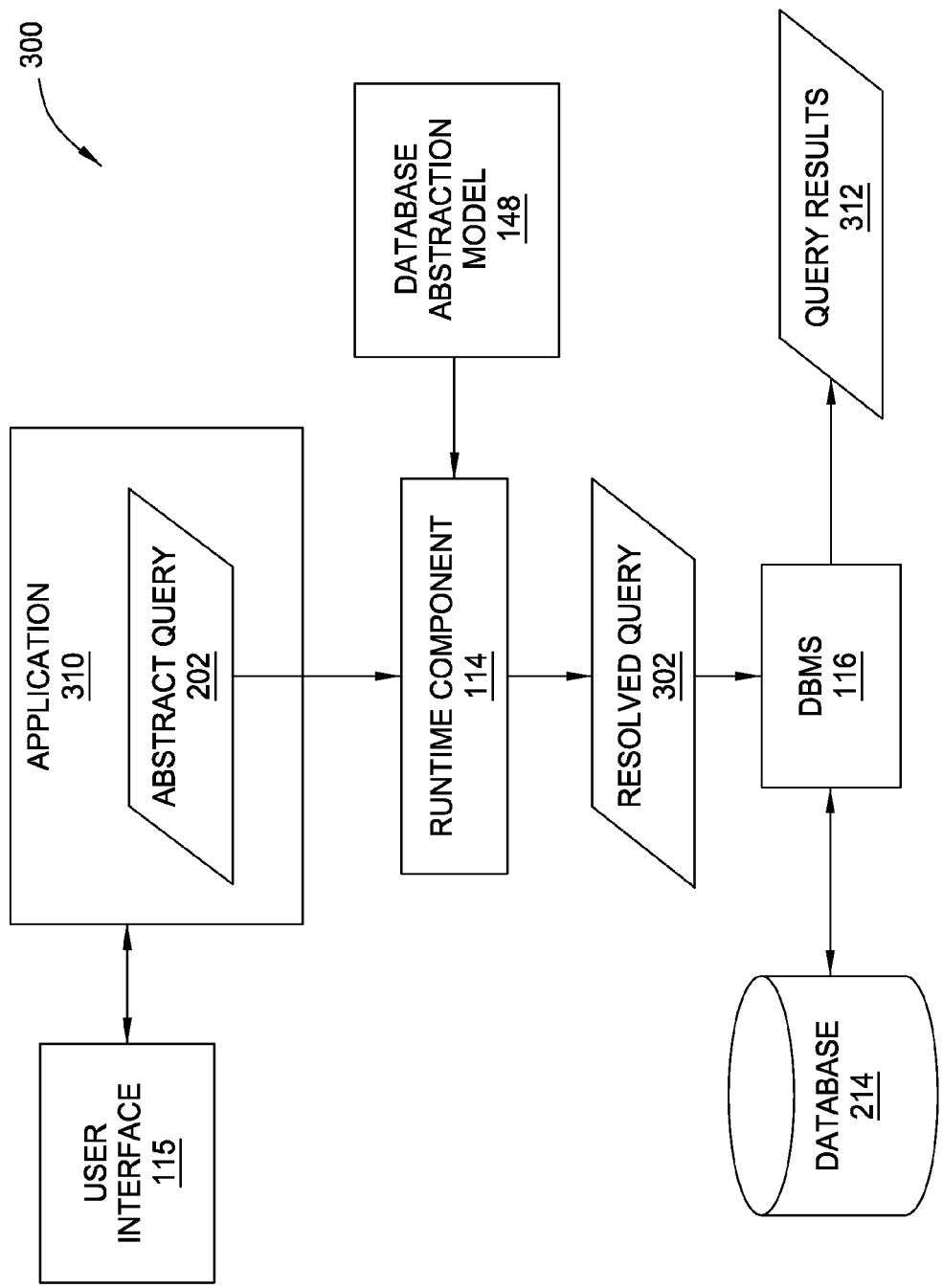
FIG. 3 illustrates a relational view of software components for executing an abstract query, according to one embodiment of the invention.

FIG. 3 illustrates a relational view 300 of software components for executing an abstract query, according to one embodiment of the invention. The software components of relational view 300 include a user interface 115, an application 310, the runtime component 114, database management system (DBMS) 116, database 214, and database abstraction model 148.

As shown, the application 310 includes an abstract query 202. Illustratively, the abstract query 202 is created in the user interface 115, such as a graphical user interface (GUI). However, note that the user interface 115 is only shown by the way of example; any suitable requesting entity may create abstract query 202 (e.g., the application 310, an operating system, or an end user).

In one embodiment, the abstract query 202 is translated by the runtime component 114 into a resolved query 302. This translation is performed with the use of the database abstraction model 148, as described above with reference to FIGS. 2A-2D. The resolved query 302 is submitted to the DBMS 116 for execution against the database 214, thus producing a set of query results 312. The query results 312 may be presented to a user (i.e., in user interface 115), or may be used for further processing (e.g., as inputs for rule processing, etc.).

Figure 4:
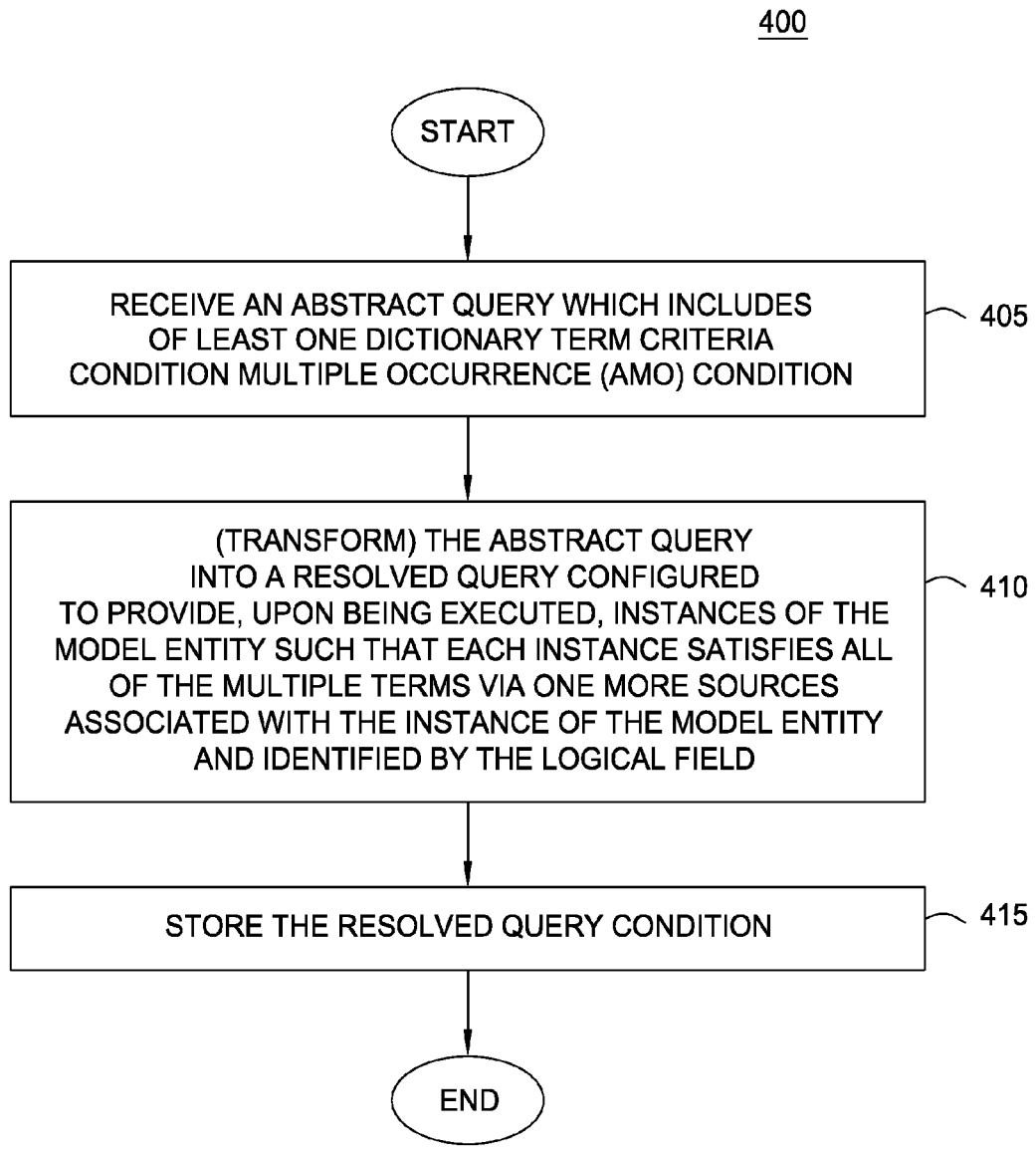
FIG. 4 is a flow diagram illustrating a method for composing a dictionary term criteria condition, according to one embodiment of the invention.

FIG. 4 is a flow diagram illustrating a method 400 for processing a query with a dictionary term criteria condition, according to one embodiment of the invention. As described above, such a dictionary term criteria condition is used to request results where multiple terms are requested and where each term is present in a distinct document (or other text source).

As shown, method 400 starts begins at step 405 where a user composes an abstract query and submits it for execution. The abstract query may include any number of query conditions and result specifications composed using the logical fields of a data abstraction model. Further, the query may include at least one dictionary term criteria condition—specifying a set of terms and a logical field identifying what documents in which to search for the terms. The query may also specify a model entity (a focus) from a set of model entities defined by the data abstraction model. In one, the abstract query is composed by a user interacting with a user interface. Alternatively, such information may be provided from execution of another query, by a software component, and so on.

At step 410, the abstract query condition is transformed into a resolved query, i.e., a query suitable for executing on a set of physical database systems underlying a data abstraction model. The resolved query may be executed to return instances of the model entity (and data requested each instance). For example, if the terms are 'Disease 1, Disease 2 ... Disease N,' the model entity is 'Patient', and the logical field for the dictionary term criteria condition identifies a column of 'Patient Visit Notes,' then an instances of the "patient" model entity (identified, e.g., for example, by a patient ID) satisfies the terms when in one or more of the documents contained in the 'Patient Visit Notes' for the particular patient, has at least one record for each of the terms. That is, a particular patient is identified in query results when the patient has a "Patient Visit Note" that includes the term "Disease 1," and separate "Patient Visit Notes" that include "Disease 2" up through "Disease N." A more detailed example of the transforming step 410 is described below with respect to FIG. 5.

Method 400 terminates with step 415 where the resulting resolved query is stored, for example in the memory of a computer. In one embodiment, the resolved query is stored only for a short period of time, for example, until it can be submitted for execution to an underlying database system. In other embodiment, the resolved query (or components thereof) is stored for a longer period of time, for example, for use in composing other queries.

Figure 5:
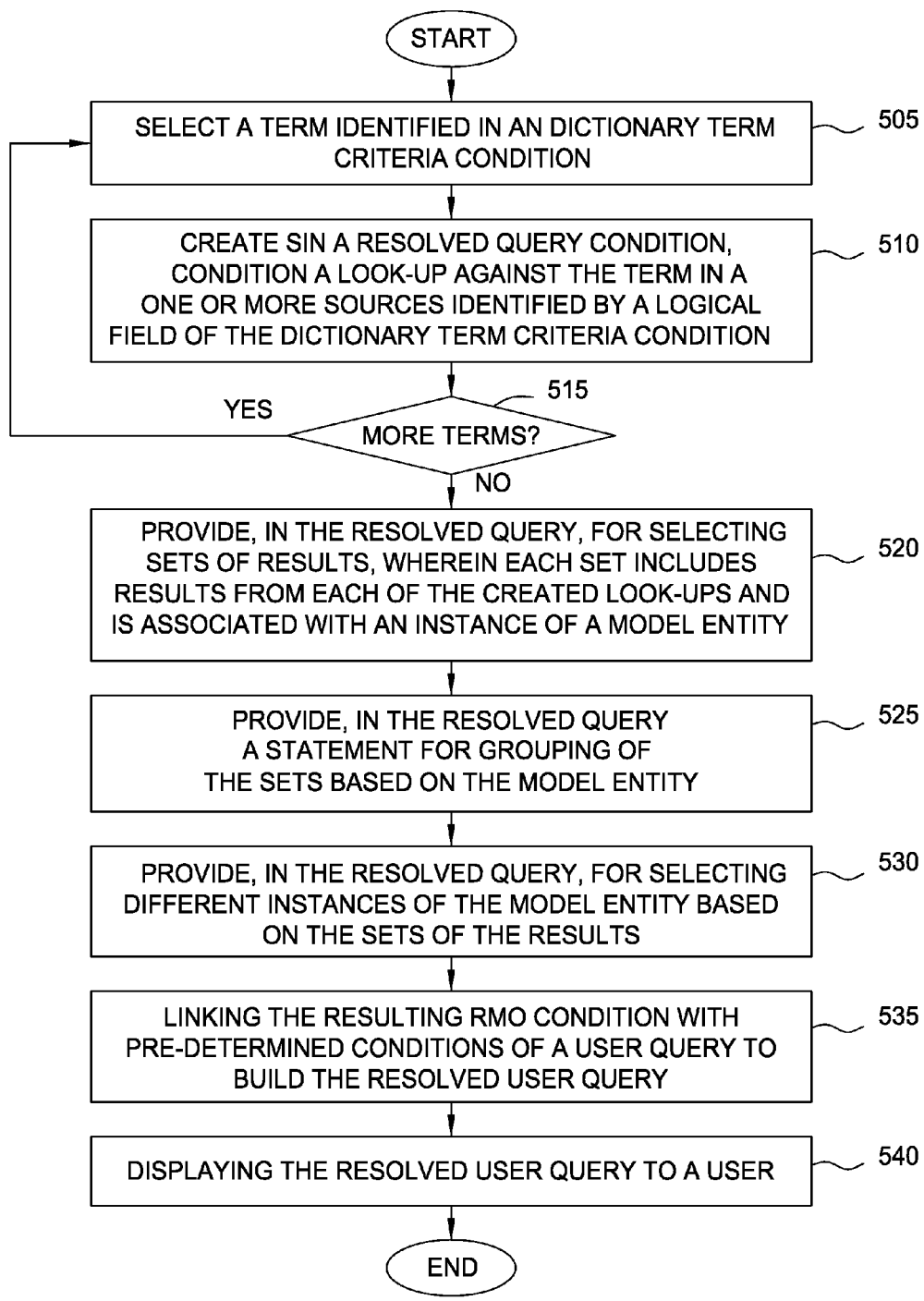
FIG. 5 is a flow diagram illustrating a method for composing an abstract query, according to one embodiment of the invention.

FIG. 5 is a flow diagram illustrating method 500 for processing an abstract query, according to one embodiment of the invention. As shown, the method 500 begins at step 505. At step 505, one of the terms of an abstract dictionary term criteria condition is selected. At step 510, a look-up against the selected term is created that references the underlying data source identified by a logical field of the dictionary term criteria condition. For example, assume the dictionary term criteria condition specifies a set of terms for a logical field referencing "patient notes" and that this logical field points to a column in a database table where each entry in the column stores a patient note for a patient (identified by a Patient ID value in another column of the database table). In such a case, a lookup is generated against this database table for one of the terms in the dictionary term criteria condition. At step 515, if more dictionary terms were included in the query (i.e., keywords) the method returns to step 505, where another term is selected and another look-up for that term is generated for a resolved query. Importantly, therefore, a separate look-up is created for each term identified in the dictionary term criteria condition. In other words, in one embodiment, the series of steps 505-515 is repeated until such the look-ups are created for each of the terms identified by the dictionary term criteria condition.

For example, FIG. 7A illustrates a resolved query 642 generated. In particular, the terms identified by a dictionary term criteria condition include "taxes," "hiccupping," and "satisfied." In this example, the sub-queries 715 represent the result of repeating steps 505-515. Importantly, each lookup represents a separate instance of a table used to search for one of the keyword terms.

Returning to FIG. 5, at step 520, a portion of the resolved query is generated to evaluate output of the results of the created look-ups (i.e., of sub-queries 715) More specifically, sets of results are selected, where each set includes results from one of the created look-ups. The sets of results may further all be associated with a particular instance of the model entity identified by the abstract query. For example, if the model entity is a 'patient,' an instance of the model entity is a particular patient (e.g., identified by 'Patient ID)' and the corresponding set includes the documents containing reference to that particular patient.

In one embodiment, the output of a look-up for a particular term is represented by a numeric value where the value greater than zero indicates that the term is in the documents (e.g., in at least one the patient notes) and zero indicates the term is not found within the documents. The result of step 520 may be seen in FIG. 7A, identified as item 705. Note, that the result may effectively represent a matrix of all documents and all the terms found.

At step 525, a portion of the resolved query is generated to group the results based on the model entity. (e.g., to order query results based on patient ID values. Further, as shown in FIG. 7A at 720, a condition may be added to only return all instances of the model entity (e.g., all patients) that have all the terms (e.g., 'taxes,' 'hiccupping,' and 'satisfied') in the sources associated with the logical field.

The above described process of steps 505 through 525 illustrate an approach for creating of a resolved query for a dictionary term criteria condition. However, it might be desirable to have additional conditions in a final query, including other multiple-occurrence conditions. In other words, the multiple-occurrence condition might need to be included within another set of conditions, such as, for example, 'othercondition1,' 'othercondition2,' and 'othercondition3' shown in FIG. 7A. For example, a simple condition of "Patient age>35" could be specified in an abstract query. In such a case, a resolved query may be generated to identify patients older than 35, and the results of such a query could be intersected with the results of the resolved query shown in FIG. 7A. Accordingly, at step 530 and 535, the resulting multiple-occurrence condition may be linked to such additional conditions to build the final query. In FIG. 7A, such a linking is shows by in the portion of the "WHERE" clause of this example query that includes "other condition 1 AND other condition 2."

Though not necessary, in one embodiment, at step 540, the query is displayed to the user via, for example, a graphical user interface. The user may choose to run the query, or modify the query by modifying respective abstract query.

Figure 6:
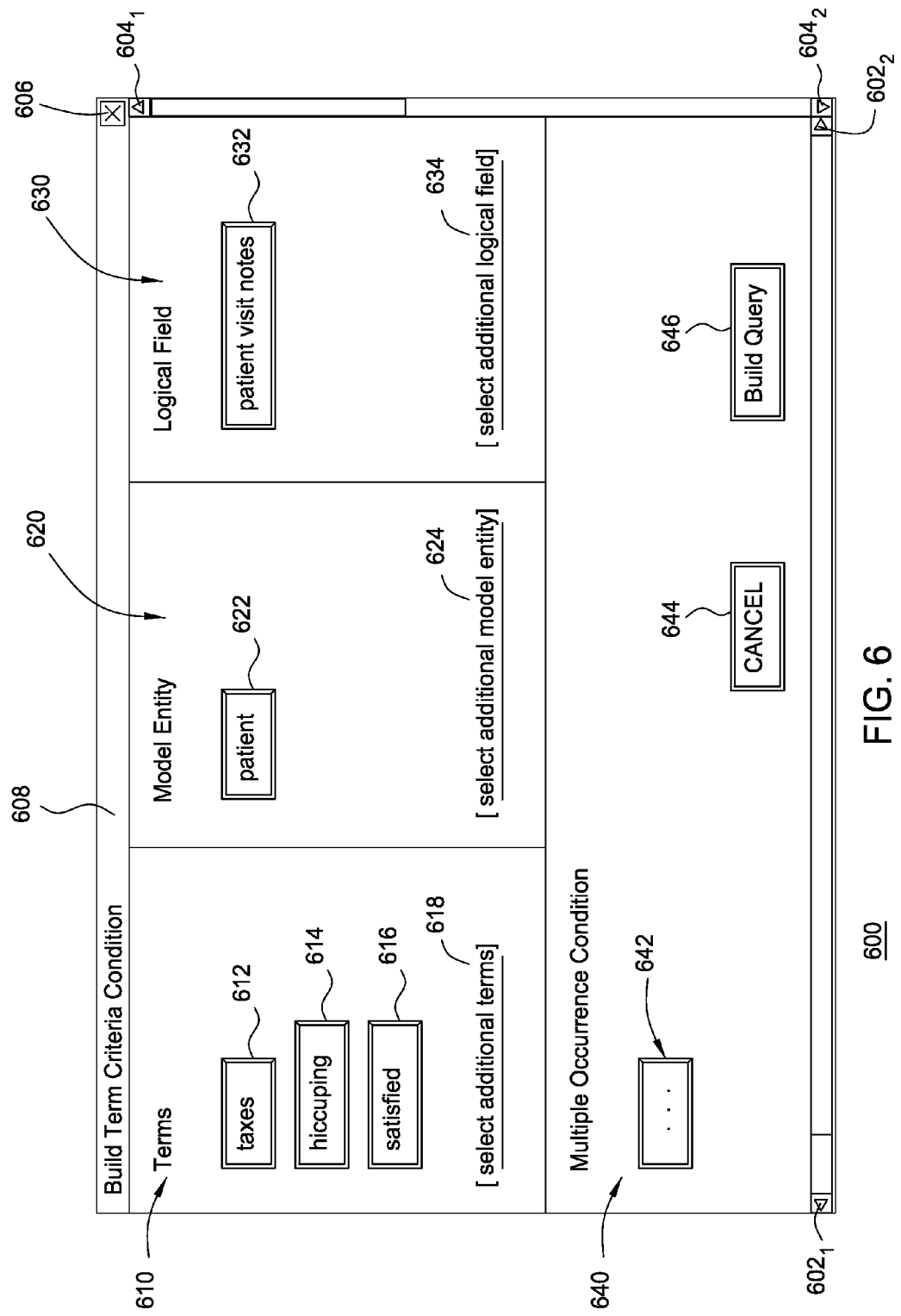
FIG. 6 illustrates a graphical user interface of a query application configured for composing a dictionary term criteria condition, according to one embodiment of the invention.

FIG. 6 illustrates a window 600 of a graphical user interface (GUI) of a query application configured for composing a dictionary term criteria condition queries, according to one embodiment of the invention. Illustratively, the window 600 includes four sections: a 'Terms' section 610 for selecting keywords; a 'Model Entity' section 620 for identifying a model entity; a 'Logical Field' section 630 for identifying where the terms associated with instances of the model entity should be searched; and a 'Multiple Occurrence' Section 640 for displaying the resulting multiple-occurrence condition to the user. Window 600 also includes title 608, horizontal scrolling controls 602, vertical scrolling controls 604, and window closing control 606.

In one embodiment, 'Terms' section 610 shows terms already selected by a user, e.g., terms "taxes," "hiccupping," and "satisfied," and includes additional control 618 labeled "select additional terms," which the user selects to define additional terms of the dictionary term criteria condition. As discussed above, terms define limitations or criteria for data records that are returned for instances of the model entity. Upon selection of control 618, a pop-up window may be displayed to the user. The user may enter additional terms in the pop-up window, or alternatively, select the additional term among the available terms. Upon a new additional term being entered, such a term is displayed to the user in 'Terms' section 610 together with the previously selected terms.

Illustratively, 'Model entity' section 620 shows a model entity selected by a user, e.g., "patient." As discussed above, the model entity defines a focus of an abstract query. Accordingly, typically only one model entity would be selected by a user. However, in one embodiment, the user is provided with an option of selecting more than one model entity, via control 624, labeled "select additional model entity." Similar to 'Terms' section, upon the user selecting control 624, a pop-up window (not shown) is displayed, where the user may enter an additional model entity, or alternatively, select the additional model entity. Upon the new model entity term being selected, the model entity is displayed to the user in the 'Model Entity' section 620 together with the previously selected model entities.

In one embodiment, 'Logical Field' section 630 shows logical fields selected by a user, e.g., "patient visit notes." In the dictionary term criteria condition, logical fields generally define data to which the resulting multiple-occurrence condition should be applied. In other words, the logical field specifies data sources, such as one or more documents for a given column, e.g., 'Patient Visit Notes' which should be evaluated to process the dictionary term criteria condition. As described above, a logical field provides representation of a specific set of data in an underlying database. According to one embodiment, the logical fields are defined independently of the underlying physical representation being used in the database. When more than one logical field is selected such logical fields are linked. To add logical fields to the dictionary term criteria condition, in one embodiment, a user selects control 634, labeled select additional logical field. Upon the selection, a pop-up window may be displayed to the user, where the user selects or enters additional logical fields, which are subsequently displayed to the user in 'Logical Field' section 630.

'Multiple-occurrence condition' section 640 displays a resulting query 642 having a dictionary term criteria condition composed based on the AMO condition created in sections 610, 620, and 630. FIGS. 7A and 7B illustrate examples of such multiple occurrence queries. The user has an option of canceling the selections made and returning to building the abstract query by selecting control 644 labeled "CANCEL." The user also has an option of incorporating the multiple-occurrence condition into the final query by selecting control 646 labeled "Build Query." Upon selecting control 646, in one embodiment, the user is provided with an opportunity to add more conditions to the final query, including other dictionary term criteria conditions.

Note that window 600 is merely an example of the graphical user interface accordingly to one embodiment and other representations and implementations are possible. For example, not every user needs to see the resulting multiple-occurrence condition query 642, and thus, in one embodiment query 642 is not displayed. Alternatively, the multiple-occurrence condition query, or only the condition, may be displayed upon a specific request from the user. Further, in one embodiment, the user is required to define a logical field and model entity before defining the terms, for example, to limit the selection of available terms.

As discussed above, FIGS. 7A and 7B illustrate different versions of a multiple-occurrence condition query 642, according to two different embodiments of the invention. In FIG. 7A, lines representing the multiple-occurrence condition are shown between lines 705, while "othercondition1, othercondition2, and othercondition3" represent other non-multiple-occurrence conditions of the query.

Query 642 of FIG. 7B is an optimized version of query 642 of FIG. 7A. In particular, to generate the query of FIG. 7B, term searches for a given patient are performed only when previous terms for that patient have been already found. Checking for terms is pushed to individual sub-queries and the existence of a hit is required to be found directly in the joined table. In this manner, the need for the aggregation/having clause of the query of FIG. 7A is removed. Consequently, the optimized query provides for improved SQL performance and conserves resources, such as memory. A person skilled in the art would appreciate that other types of optimizations are also possible.

Figure 8:
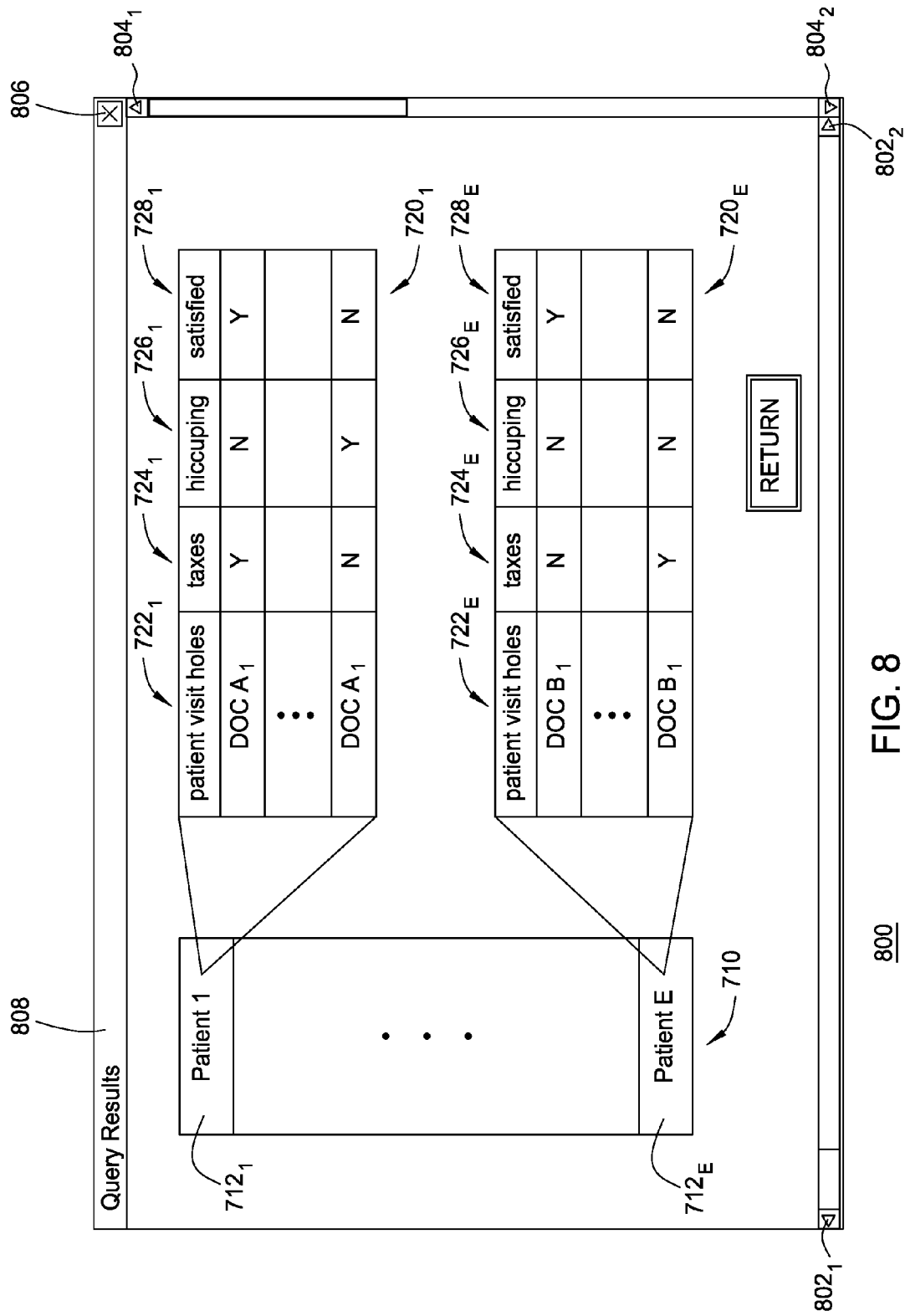
FIG. 8 illustrates a graphical user interface of a query application configured for displaying results generated by executing a query with a dictionary term criteria condition, according to one embodiment of the invention.

FIG. 8 illustrates window 800 of a graphical user interface of a query application configured for displaying results generated by executing a dictionary term criteria condition, according to one embodiment of the invention. As shown, window 800 includes a title 808, horizontal scrolling controls 802, vertical scrolling controls 804, and window closing control 806. The main section of window 800 lists results generated by executing the a resolved query generated from an abstract query which included the dictionary term criteria condition. In the present example, results 714 included in the result list 710 are patient IDs $714_1$-$714_E$ of patients that have one or more records containing the terms, where at least one distinct record contains each term.

In one embodiment, the user is provided with an opportunity to see all documents containing at least one of the terms. For example, as shown, if a user clicks on a particular patient ID 714, a pop-up window containing table 720 is displayed to the user. The table 720 contains a column 722 listing all such documents and a column for each of the terms, e.g., column 724 for 'taxes,' column 726 for 'hiccupping,' and column 728 for 'satisfied.' Each of the columns contains indications of whether the respective term is present in each of the documents of column 722. For example, "Y" indicates that a record containing the term may be found for the patient in the given document, and "N" indicates otherwise.

Note however, that in one embodiment, because a single document may contain multiple terms and multiple documents may contain the same terms, only a representative sample of the documents is displayed to the user. In another embodiment, instead of displaying tables 720 only a list of relevant documents is provided. In yet another embodiment, no pop-up windows are employed. Rather all the results are directly displayed in window 800. In another embodiment, the user is provided only with the list of instances of the model entity, e.g. patients.

Advantageously, as described herein, embodiments of the invention enable composing a multiple-occurrence condition query, based on an abstract query defined by a user. In particular, the multiple-occurrence condition of the query provides for determining instances of the abstract query's model entity in the sources identified by the abstract query that satisfy the terms defined by the abstract query. Advantageously, the above described techniques allow finding an instance satisfying all the terms even when records associated with the instance and containing two different terms are present only in a single and the same source.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing an abstract query of an underlying physical database, comprising:
providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity;
receiving an abstract query composed from one or more logical fields of the database abstraction model, wherein at least a first logical field in the abstract query is specified in a dictionary term criteria condition, wherein the dictionary term criteria condition includes a list of one or more keywords, wherein the access method specified by the first logical field maps the first logical field to a plurality of documents related to a given instance of the model entity, wherein the dictionary term criteria condition is evaluated by determining whether the plurality of documents related to the given instance of the model entity includes at least a distinct document containing a respective one of the one or more keywords, and wherein each of the plurality of documents are stored as unstructured text in a column of a table in the underlying physical database;
generating, from the abstract query, a resolved query of the underlying physical database; and
storing the resolved query for execution against the underlying physical database.

2. The method of claim 1, further comprising:
executing the resolved query to identify one or more instances of the model entity that satisfy the dictionary term criteria condition; and
returning, to a requesting entity, an indication of the identified instances of the model entity.

3. The method of claim 2, further comprising, presenting results of the executed query to the user in a graphical user interface on a display device.

4. The method of claim 1, wherein generating, from the abstract query, a resolved query of the underlying physical database comprises:
generating, for each of the plurality of terms, an instance of the table;
generating, for each instance of the table, a sub query configured to identify instances of the model entity for which the unstructured text contains a respective one of the keywords;
generating an intersecting query configured to intersect the results of each of the sub queries to identify instances of the model entity which include at least one distinct document for each keyword.

5. The method of claim 1, wherein the abstract query further specifies at least one condition composed from one or more logical fields of the data abstraction model.

6. The method of claim 1, wherein the abstract query further specifies at least one result field specifying data stored by the underlying database to return for instances of the model entity that satisfy the dictionary term criteria condition.

7. The method of claim 1, wherein the resolved query is composed using the SQL query language.

8. A non-transitory computer-readable storage medium containing a program which, when executed on a processor, performs an operation for processing an abstract query of an underlying physical database, the operation comprising:

providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity;

receiving an abstract query composed from one or more logical fields of the database abstraction model, wherein at least a first logical field in the abstract query is specified in a dictionary term criteria condition, wherein the dictionary term criteria condition includes a list of one or more keywords, wherein the access method specified by the first logical field maps the first logical field to a plurality of documents related to a given instance of the model entity, wherein the dictionary term criteria condition is evaluated by determining whether the plurality of documents related to the given instance of the model entity includes at least a distinct document containing a respective one of the one or more keywords, wherein each of the plurality of documents are stored as unstructured text in a column of a table in the underlying physical database;

generating, from the abstract query, a resolved query of the underlying physical database; and storing the resolved query for execution against the underlying physical database.

9. The non-transitory computer-readable storage medium of claim 8, wherein the operation further comprises:

executing the resolved query to identify one or more instances of the model entity that satisfy the dictionary term criteria condition; and returning, to a requesting entity, an indication of the identified instances of the model entity.

10. The non-transitory computer-readable storage medium of claim 9, wherein the operation further comprises, presenting results of the executed query to the user in a graphical user interface on a display device.

11. The non-transitory computer-readable storage medium of claim 8, wherein generating, from the abstract query, a resolved query of the underlying physical database comprises:

generating, for each of the plurality of terms, an instance of the table;

generating, for each instance of the table, a sub query configured to identify instances of the model entity for which the unstructured text contains a respective one of the keywords;

generating an intersecting query configured to intersect the results of each of the sub queries to identify instances of the model entity which include at least one distinct document for each keyword.

12. The non-transitory computer-readable storage medium of claim 8, wherein the abstract query further specifies at least one condition composed from one or more logical fields of the data abstraction model.

13. The non-transitory computer-readable storage medium of claim 8, wherein the abstract query further specifies at least one result field specifying data stored by the underlying database to return for instances of the model entity that satisfy the dictionary term criteria condition.

14. The non-transitory computer-readable storage medium of claim 8, wherein the resolved query is composed using the SQL query language.

15. A system, comprising:

a processor; and a memory storing an application, which, when executed by the processor is configured to perform an operation for processing an abstract query of an underlying physical database, the operation comprising:

providing a database abstraction model, wherein the database abstraction model provides (i) a plurality of logical fields that each specify an access method defining a method for accessing data associated with a respective logical field, and (ii) a plurality of model entities, wherein each model entity specifies a set of logical fields that map to data related to a respective model entity and specifies an identifier in the underlying database used to identify instances of the respective model entity, receiving an abstract query composed from one or more logical fields of the database abstraction model, wherein at least a first logical field in the abstract query is specified in a dictionary term criteria condition, wherein the dictionary term criteria condition includes a list of one or more keywords, wherein the access method specified by the first logical field maps the first logical field to a plurality of documents related to a given instance of the model entity, wherein the dictionary term criteria condition is evaluated by determining whether the plurality of documents related to the given instance of the model entity includes at least a distinct document containing a respective one of the one or more keywords, wherein each of the plurality of documents are stored as unstructured text in a column of a table in the underlying physical database, generating, from the abstract query, a resolved query of the underlying physical database, and storing the resolved query for execution against the underlying physical database.

16. The system of claim 15, wherein the operation further comprises:

executing the resolved query to identify one or more instances of the model entity that satisfy the dictionary term criteria condition; and returning, to a requesting entity, an indication of the identified instances of the model entity.

17. The system of claim 16, wherein the operation further comprises, presenting results of the executed query to the user in a graphical user interface on a display device.

18. The system of claim 15, wherein generating, from the abstract query, a resolved query of the underlying physical database comprises:

generating, for each of the plurality of terms, an instance of the table;

generating, for each instance of the table, a sub query configured to identify instances of the model entity for which the unstructured text contains a respective one of the keywords;

generating an intersecting query configured to intersect the results of each of the sub queries to identify instances of the model entity which include at least one distinct document for each keyword.

19. The system of claim 15, wherein the abstract query further specifies at least one condition composed from one or more logical fields of the data abstraction model.

20. The system of claim 15, wherein the abstract query further specifies at least one result field specifying data stored by the underlying database to return for instances of the model entity that satisfy the dictionary term criteria condition.

21. The system of claim 15, wherein the resolved query is composed using the SQL query language.

* * * * *